May 10, 1932.                W. SEIZ                1,857,164
                  SPEED OR LOAD CONTROL SYSTEM
                       Filed March 1, 1929
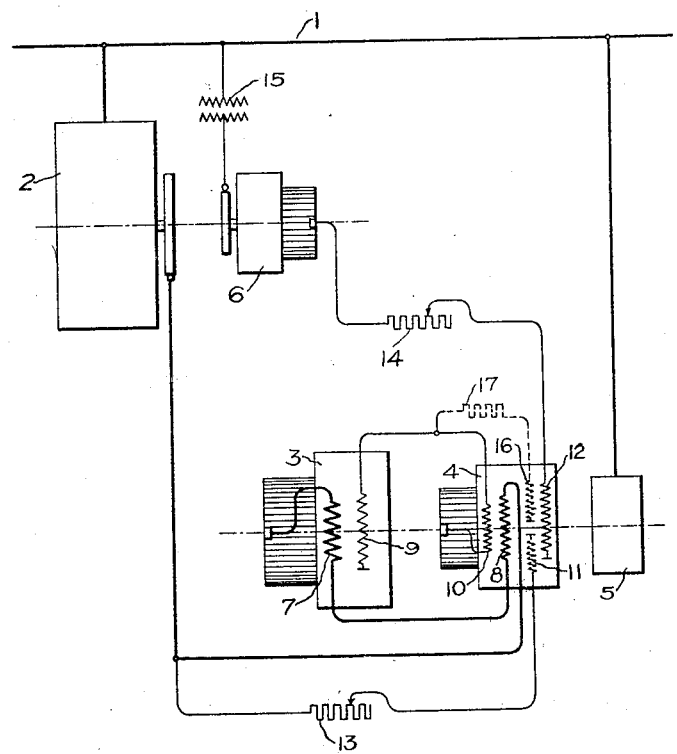
Inventor:
Walter Seiz,
by Charles E. Tullar
His Attorney.

Patented May 10, 1932

1,857,164

UNITED STATES PATENT OFFICE

WALTER SEIZ, OF BADEN, SWITZERLAND, ASSIGNOR TO GENERAL ELECTRIC COMPANY, A CORPORATION OF NEW YORK

SPEED OR LOAD CONTROL SYSTEM

Application filed March 1, 1929, Serial No. 343,757, and in Germany March 5, 1928.

My invention is preferably described in connection with a load control system and relates to improvements in the excitation of regulating machines such as those employed in cascade with induction machines.

In a well-known system of cascade control the secondary winding of the induction machine is excited from a commutator regulating machine having on its stator exciting windings which are supplied with exciting current from the secondary of the induction machine and a commutator type frequency changer, often called an ohmic drop exciter.

In accordance with my invention I have modified this arrangement by providing a special auxiliary exciter for supplying excitation current to the commutator regulating machine. The auxiliary exciting machine is provided with an exciting winding through which the current in the secondary of the main induction motor is allowed to flow. At least two additional exciter windings are also provided for the auxiliary exciter, one of which is supplied with exciting current from a frequency changing exciter, the other being supplied with a current which is proportional to the voltage of the exciter machine. The field winding of the auxiliary exciter which is connected in series in the cascade circuit produces a flux which in general is in opposition and equal to the flux produced by the winding energized by the frequency changing exciter. A relatively smaller resultant flux which determines the excitation of the auxiliary exciter and the cascade system is thus produced by the third exciting winding energized in proportion to the voltage of the exciter machine. This resultant flux is such as to normally maintain a substantially constant current in the induction machine but it may be easily modified in a reliable manner for regulating purposes. The armature of the auxiliary exciter is electrically connected with the exciting winding of the commutator regulating machine and supplies an exciting current thereto which is proportional to the resultant flux of the exciting windings on the auxiliary machine.

The features of my invention which are believed to be novel and patentable will be pointed out in the claims appended hereto. For a better understanding of my invention, reference is made in the following description to the accompanying drawing in which the single figure shows diagrammatically a cascade regulating system embodying the present invention.

Referring now to the drawing the network is denoted by 1, the main motor by 2, the commutator a. c. machine by 3 and its exciter by 4. Machines 3 and 4 are driven by the auxiliary motor 5 but they can be also separately driven, or one or both machines can be coupled to the main motor. A frequency changer 6 is coupled to the main motor. The commutator a. c. machine 3 is provided with a compensating winding 7 which is traversed by the armature current. This compensating winding is connected to the slip rings of the main motor in series with the main current excited exciter winding 8 of the exciter. The commutator a. c. machine 3 is provided with an exciting winding 9 which receives its current through the compensating winding 10 of the exciter, from the armature circuit of the latter. 11 and 12 are two exciter windings of the exciter with external excitation. Winding 11 is connected to the slip rings of the main motor through a resistor 13, while winding 12 is connected to the commutator side of the frequency changer 6 through another resistor 14. Constant voltage is impressed on the slip rings of frequency changer 6 through transformer 15. Rheostats 13 and 14 constitute throughout the entire range of regulation a multiple of the reactance of windings 11 and 12, so that the flux of winding 11 is approximately proportional to the slip ring voltage of the main motor and the flux of winding 12 is approximately constant. Both fluxes can be regulated to any desired magnitude in any well known manner, by adjustment of the rheostats 13 or 14 independently of each other, either manually or automatically. The purpose of winding 16 and of rheostat 17 will be explained later.

The object of winding 12 is to determine the magnitude of the current in the primary winding of machine 2 by determining the magnitude of its secondary current. If only windings 8 and 12 were used the magnitude of the flux produced by winding 8 would have to be less than that produced by winding 12 in order to leave a resultant flux in exciter 4 so as to maintain the current flow in the secondary of 2 as nearly as possible to the value prescribed by the current in 12, and therefore the current in winding 8 and hence in the primary winding of 2, would be lower than the value it is prescribed to have for the adjusted value of current in winding 12. The larger the value of adjusted current in 12, the larger is the current in the secondary of 2 and the larger is the resultant flux in exciter 4 necessary to maintain the increased current in the secondary of 2, thus causing the primary current of 2 to deviate still further from the value prescribed by the current in winding 12. This deviation I call the fault current $dJ$. The object of winding 16 is to supply at all times the above described necessary resulting flux in exciter 4, thus eliminating the fault current $dJ$ and maintaining the secondary current of 2 in a substantially constant and direct ratio to the current in winding 12. The operation of winding 16 to effect this result is described near the end of the specification. The object of winding 11 is to vary this direct ratio in response to the slip of machine 2 from its synchronous speed, and the operation with winding 11 will now be described. By using winding 16 there is substantially no fault current $dJ$ and the armature current of exciter 4 and hence the secondary and primary currents of machine 2 consist of a constant component due to winding 12 and a component that is proportional to the slip due to winding 11. The magnitude of those components may be adjusted to any desired value by regulating the exciter circuits 13 and 14. The phase position of the constant and of the variable current components of the rotor current in the main motor is determined by the phase position of the currents in windings 11 and 12 and by the connection of windings 8, 11 and 12. Thus the active and the reactive components of the rotor current may be made to consist of a constant component and of another component which is proportional to the slip of the main motor.

In the case of a given slip above or below synchronism of the main motor, the sum of the constant and variable components of the active rotor current is zero, and the motor operates at no load at such slip. In the case of any other slip the resulting active current of the rotor is equal to the geometrical sum of its constant component and its component proportional to the slip of the motor, and thus the active power component of the main motor is proportional to the variation of the slip from its no load value. Under this condition the reactive component of the rotor current can assume any value; for instance, it can be independent of the slip and constant. By regulating the constant component of the active rotor current, the no load slip of the main motor can be regulated and by adjusting the component which is proportional to the slip the no load slip and slip variation under load can be regulated. If the constant component of the active rotor current is zero, the slip of the main motor will be proportional to the load. The exciter current of the exciter which is supplied by the frequency changer then serves only to adjust the constant reactive component of the rotor current. If the reactive current is to be likewise proportional to the slip the exciter circuit which is supplied through the frequency changer can be entirely eliminated.

If, on the other hand, the active component of the rotor current which is proportional to the slip, is permanently zero, the resulting active current is permanently independent of the slip, and so is the active power component of the main motor likewise independent of the slip and constant. By means of suitable regulation in the exciter circuit 12—14, it can be adjusted so that it will be a function of any one of the operating factors or quantities but will be independent of the slip. If the exciter circuit 11 and 13 is completely eliminated, the reactive current of the rotor will be independent of the slip and will be constant.

In order to insure stable operation of the arrangement, the direction of winding 8 must be so chosen that a current flowing through winding 8 will induce along its path, through the exciter in the commutator a. c. machine, a voltage which is more than 90 degrees and preferably 180 degrees out of phase with respect to the current. In order to increase the stability of the arrangement, it might be advantageous to provide the exciter with additional excitation besides that which it derives from its armature current, in such a manner that a voltage is induced in the armature which has a direction opposite that of the current.

The operation of winding 16 to eliminate the fault current $dJ$ will now be described. The more considerable the resulting exciting flux of the exciter that is required, the greater the amount $dJ$ by which the rotor current will differ from the value which is prescribed by the flux produced by an external current in winding 12. This difference can be made approximately equal to zero by providing the exciter machine with another exciter winding 16. In the drawing this exciter winding is shown represented in dotted lines. This additional exciter winding is connected to the armature terminals of the exciter through the intermediate permanent resistor 17. If resistor 17 has a resistance which is a multiple of the reactance of winding 16, its current will be proportional to the armature voltage of the exciter. Inasmuch as in the case of an unsaturated machine and constant speed the armature voltage is proportional to the resultant flux, the flux of winding 16, at each value of the armature voltage, is proportional to the resultant flux in the exciter, and with suitable size of the resistors and of the winding it can be made approximately equal as regards magnitude and phase. Whenever the flux of winding 16 is equal to the required resultant flux in the machine, the sum of the fluxes in windings 8, 11, and 12 will be zero at each value of the armature voltage and the difference in armature current in the main motor will be zero. The armature current of the exciter is in this case equal to the geometrical sum of the currents in windings 9 and 16. Inasmuch as the effect of the arrangement does not depend on the armature current of the exciter, it will not be influenced by the superposition of the two currents.

In accordance with the provisions of the patent statutes I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. In combination, an electrical circuit connected to voltage producing means provided with an exciting winding for regulating the voltage produced and means for energizing said exciting winding so as to maintain a substantially constant value of current flow in said circuit, the said means comprising additional voltage producing means connected to said exciting winding and a plurality of exciting windings in said additional voltage producing means to regulate the voltage produced thereby, one of said plurality of exciting windings being energized by a current proportional to the current flow in said circuit, a second of said plurality of exciting windings being energized by an independent regulating current supplied from a suitable source, these last mentioned two exciting windings being arranged to produce substantially zero resulting flux when the current in the said circuit has the desired value and a third of said plurality of exciting windings energized by one of said voltage producing means so as to automatically produce at every instant the flux necessary to maintain said substantially constant value of current in said circuit.

2. In combination, an electrical circuit connected to voltage producing means provided with an exciting winding for regulating the voltage produced and means for energizing said exciting winding so as to maintain a substantially constant and direct ratio between the current in said circuit and an independent regulating current, the said means comprising additional voltage producing means connected to said exciting winding and a plurality of exciting windings in said additional voltage producing means to regulate the voltage produced thereby, one of said plurality of exciting windings being energized by a current proportional to the current flow in said circuit, a second of said plurality of exciting windings being energized by the said independent regulating current supplied from a suitable source, these last mentioned two exciting windings being arranged to produce substantially zero resulting flux when the said ratio prevails and a third of said plurality of exciting windings energized by one of said voltage producing means so as to automatically produce at every instant the flux necessary to maintain said ratio.

3. In combination, an electrical circuit connected to voltage producing means provided with an exciting winding for regulating the voltage produced and means for energizing said exciting winding so as to vary the value of the direct ratio between the current in said circuit and an independent regulating current, the said means comprising additional voltage producing means connected to said exciting winding and a plurality of exciting windings in said additional voltage producing means to regulate the voltage produced thereby, one of said plurality of exciting windings being energized by a current proportional to the current flow in said circuit, a second of said plurality of exciting windings being energized by the said independent regulating current supplied from a suitable source, these last mentioned two exciting windings being arranged to produce substantially zero resulting flux when the said ratio remains at a constant value, a third of said plurality of exciting windings energized by one of said voltage producing means so as to automatically tend to produce at every instant the flux necessary to maintain said ratio at a constant value and a fourth of said plurality of exciting windings energized by one of said voltage producing means to produce a flux acting in conjunction with the flux produced by said third exciting winding.

4. In combination, an alternating current circuit connected to voltage producing means provided with an exciting winding for regulating the voltage produced and means for energizing said exciting winding so as to maintain a substantially constant and direct ratio between the active and reactive components of the current flowing in the said circuit and the respective active and reactive components of an independent regulating current, the said means comprising additional voltage producing means connected to said exciting winding and a plurality of exciting windings in said additional voltage producing means to regulate the voltage produced thereby, one of said plurality of exciting windings being energized by a current proportional to the current flowing in the said circuit, a second of said plurality of exciting windings arranged so that the current flowing therein has active and reactive components when energized by the said independent regulating current supplied from a suitable source, these last mentioned two exciting windings being arranged to produce substantially zero resulting flux when the said ratio prevails and a third of said plurality of exciting windings energized by one of said voltage producing means so as to automatically produce at every instant the flux necessary to maintain said ratio.

5. In combination, an alternating current circuit connected to voltage producing means provided with an exciting winding for regulating the voltage produced and means for energizing said exciting winding so as to vary the value of the direct ratio between the active and reactive components of the current flowing in the said circuit and the respective active and reactive components of an independent regulating current, the said means comprising additional voltage producing means connected to said exciting winding and a plurality of exciting windings in said additional voltage producing means to regulate the voltage produced thereby, one of said plurality of exciting windings being energized by a current proportional to the current flowing in the said circuit, a second of said plurality of exciting windings arranged so that the current flowing therein has active and reactive current components when energized by the said independent regulating current supplied from a suitable source, these last mentioned two exciting windings being arranged to produce substantially zero resulting flux when the said ratio remains at a constant value, a third of said plurality of exciting windings energized by one of said voltage producing means so as to automatically tend to produce at every instant a flux having the necesssary active and reactive components to maintain said ratio at a constant value and a fourth of said plurality of exciting windings energized by one of said voltage producing means to produce a flux having active and reactive components acting in conjunction with the flux components produced by said third exciting winding.

6. In combination, an alternating current circuit connected to voltage producing means provided with an exciting winding for regulating the voltage produced and means for energizing said exciting winding so as to maintain a substantially constant and direct ratio between the active component of the current flowing in said circuit and the active component of an independent regulating current and simultaneously vary the value of the constant ratio between the reactive component of the current flowing in said circuit and the reactive component of said independent regulating current, the said means comprising additional voltage producing means connected to said exciting winding and a plurality of exciting windings in said additional voltage producing means to regulate the voltage produced thereby, one of said plurality of exciting windings being energized by a current proportional to the current flowing in said circuit, a second of said plurality of exciting windings arranged so that the current flowing therein has active and reactive current components when energized by the said independent regulating current supplied from a suitable source, these last mentioned two exciting windings being arranged to produce substantially zero resulting flux when the said ratios remain at constant values, a third of said plurality of exciting windings energized by one of said voltage producing means so as to automatically tend to produce at every instant a flux having the necessary active and reactive components to maintain said ratios at constant values and a fourth of said plurality of exciting windings energized by one of said voltage producing means to produce a flux acting in conjunction with the reactive flux component produced by said third exciting winding.

7. In combination, an alternating current circuit connected to voltage producing means provided with an exciting winding for regulating the voltage produced and means for energizing said exciting winding so as to vary the value of the direct ratio between the active component of the current flowing in said circuit and the active component of an independent regulating current and simultaneously maintain a substantially constant and direct ratio between the reactive component of the current flowing in said circuit and the reactive component of said independent regulating current, the said means comprising additional voltage producing means connected to said exciting winding and a plurality of exciting windings in said additional voltage producing means to regulate the voltage produced thereby, one of said plurality of exciting windings being energized by a current proportional to the current flowing in said circuit, a second of said plurality of exciting windings arranged so that the current flowing therein has active and reactive components when energized by said independent regulating current supplied from a suitable source, these last mentioned two exciting windings being arranged to produce substantially zero resulting flux when said ratios remain at constant values, a third of said plurality of exciting windings energized by one of said voltage producing means so as to automatically tend to produce at every instant a flux having the necessary active and reactive components to maintain said ratios at constant values and a fourth of said plurality of exciting windings energized by one of said voltage producing means to produce a flux acting in conjunction with the active flux component produced by said third exciting winding.

8. In combination with an asynchronous machine provided with a primary winding and a wound secondary, a load control system therefor comprising a source of alternating current connected to said primary winding, voltage producing means concatenated with said secondary, an exciting winding in said voltage producing means for regulating the voltage produced and means to energize said exciting winding whereby the current in said primary winding may be varied in a substantially constant and direct ratio to an independent regulating current without simultaneously changing the speed of said machine, the said means comprising additional voltage producing means connected to said exciting winding and a plurality of exciting windings in said additional voltage producing means to regulate the voltage produced thereby, one of said plurality of exciting windings being energized by a current proportional to the current flowing in said secondary, a second of said plurality of exciting windings being energized by the said independent regulating current supplied from a suitable source, these last mentioned two exciting windings being arranged to produce substantially zero resulting flux when said ratio prevails and a third of said plurality of exciting windings energized by one of said voltage producing means so as to automatically produce at every instant the flux necessary to maintain said ratio without a simultaneous change in speed of the said machine.

9. In combination with an asynchronous machine provided with a primary winding and a wound secondary, a combined load and speed control system therefor comprising a source of alternating current connected to said primary winding, voltage producing means concatenated with said secondary, an exciting winding in said voltage producing means for regulating the voltage produced thereby and means to energize said exciting winding whereby the current in said primary winding may be varied in a substantially constant and direct ratio to an independent regulating current with a simultaneous change in the speed of said machine, the said means comprising additional voltage producing means connected to said exciting winding and a plurality of exciting windings in said additional voltage producing means to regulate the voltage produced thereby, one of said plurality of exciting windings being energized by a current proportional to the current flow in said secondary, a second of said plurality of exciting windings being energized by the said independent regulating current supplied from a suitable source, these last mentioned two exciting windings being arranged to produce substantially zero resulting flux when the said ratio prevails, a third of said plurality of exciting windings energized by one of said voltage producing means so as to automatically tend to produce at every instant the flux necessary to maintain said ratio without a simultaneous change in speed of the said machine and a fourth of said plurality of exciting windings energized by one of said voltage producing means to produce a flux acting in conjunction with the flux produced by said third exciting winding.

10. In combination with an asynchronous machine having a wound secondary, a regulating system therefor comprising a regulating machine electrically connected to said secondary, an exciting winding in said regulating machine, an exciter machine electrically connected to said exciting winding, a plurality of exciting windings in said exciter machine, frequency changing means supplying to one of said plurality of exciting windings an independent regulating current having the same frequency as the current in said secondary, a second of said plurality of exciting windings energized by a current proportional to and having the same frequency as the current in said secondary, these last mentioned two exciting windings being arranged to produce opposing magnetic fluxes, a third of said plurality of exciting windings energized by a current substantially proportional to the voltage of said exciter machine and means to rotate said regulating and exciter machines.

11. In combination with an asynchronous machine having a wound secondary, a regulating system therefor comprising a regulating machine electrically connected to said secondary, an exciting winding in said regulating machine, an exciter machine electrically connected to said exciting winding, a plurality of exciting windings in said exciter machine, frequency changing means supplying to one of said plurality of exciting windings an independent regulating current having the same frequency as the current in said secondary, a second of said plurality of exciting windings energized by a current proportional to and having the same frequency as the current in said secondary, these last mentioned two exciting windings being arranged to produce opposing magnetic fluxes, a third and fourth of said plurality of exciting windings energized by currents substantially proportional to the respective voltages of said exciter and regulating machines and means to rotate said regulating and exciter machines.

In witness whereof I have hereunto set my hand this 13th day of February, 1929.

WALTER SEIZ.